(No Model.)
E. M. HEWLETT & W. B. POTTER.
THREE WIRE ELECTRIC SYSTEM.
No. 554,270. Patented Feb. 11, 1896.
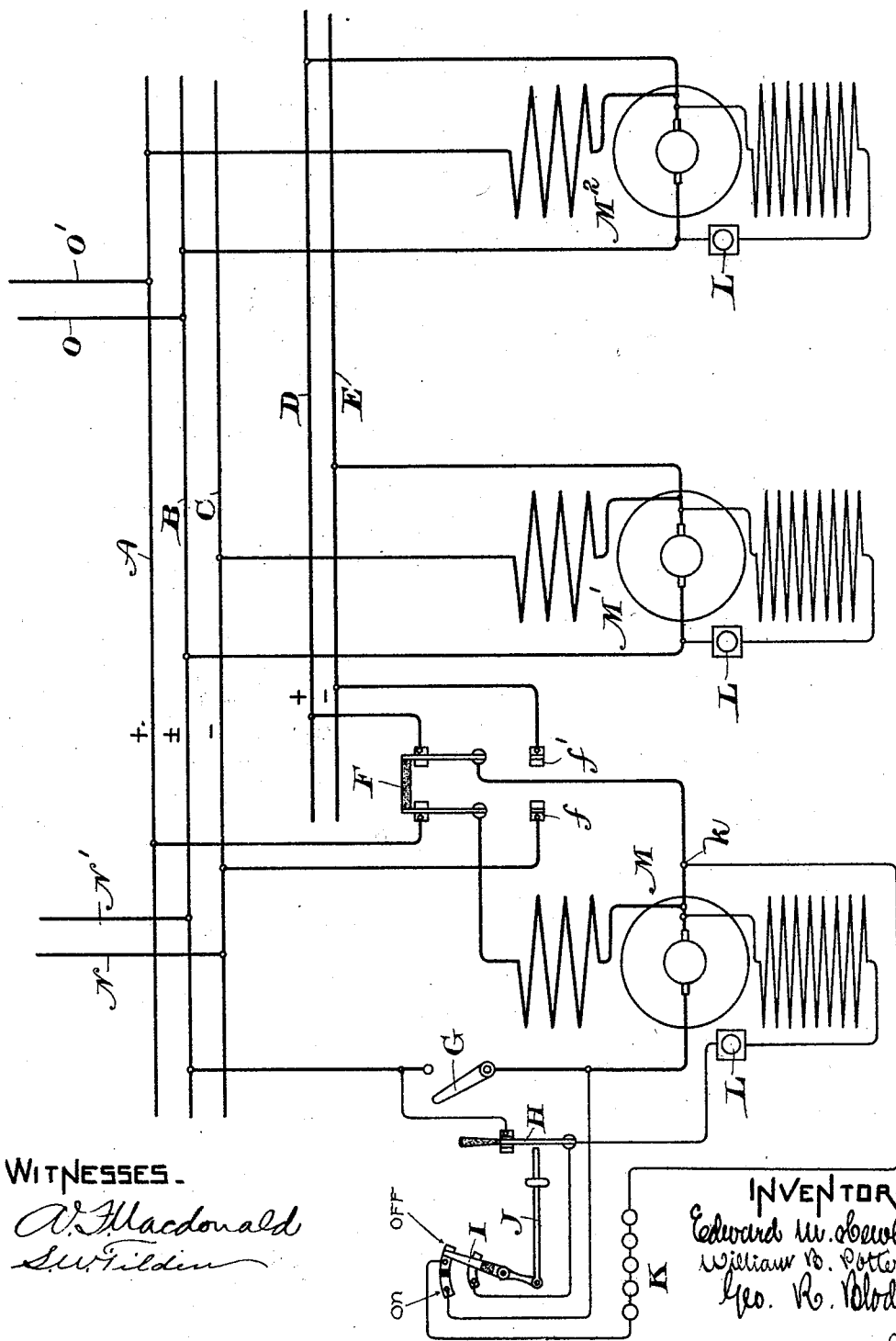
WITNESSES.
A. F. Macdonald
S. W. Tilden
INVENTORS.
Edward M. Hewlett and
William B. Potter,
by Geo. R. Blodgett,
Atty.

UNITED STATES PATENT OFFICE.

EDWARD M. HEWLETT AND WILLIAM B. POTTER, OF SCHENECTADY, NEW YORK, ASSIGNORS TO THE GENERAL ELECTRIC COMPANY, OF NEW YORK.

THREE-WIRE ELECTRIC SYSTEM.

SPECIFICATION forming part of Letters Patent No. 554,270, dated February 11, 1896.

Application filed September 10, 1895. Serial No. 562,046. (No model.)

*To all whom it may concern:*

Be it known that we, EDWARD M. HEWLETT and WILLIAM B. POTTER, citizens of the United States, residing at Schenectady, in the county of Schenectady and State of New York, have invented certain new and useful Improvements in Three-Wire Electric Systems, of which the following is a specification.

The object of the present invention is to allow a compound-wound generator to be thrown onto either side of a three-wire system for power, electric lighting, or railway work.

Heretofore three-wire systems have been supplied by shunt-wound generators, and all that is necessary in this case, when throwing a machine from one side to the other, is to reverse the mains leading from the generator to the bus-bars on the switchboard, and if the current and potential indicating instruments are between the generator and the bus-bars the connections to them would have to be reversed. Such a system was described in patent to E. M. Hewlett, No. 537,533, dated April 16, 1895.

In running compound machines, as ordinarily connected, there is an equalizing connection between the positive brushes of the several machines which equalizes the flow of current through the series coil of each generator. It is evident that this coil must energize the field in the same direction as the shunt-winding, and if the main leads were simply reversed the current flowing through the equalizer from the other machines would be opposed to that generated by the reversed machine, so in order to have the current flow through the series coil in the right direction two equalizers are provided, one for the machines on the positive sides of the system and the other for those on the negative, and we style these "positive" and "negative" equalizers. There is always a certain amount of magnetism in a field-pole, even when there is no current flowing in the energizing-coils, and to insure the machine generating current in the proper direction a current is momentarily passed through the fields from the bus-bars, and in such a direction that when the generator starts up the current will be of the same sign as the side on which it is thrown. This method of insuring the magnetization of the proper sign is commonly known as "flashing."

The invention further consists in arranging two of the switches with an interlocking mechanism between them, so that when the machine is being "flashed" the switch closing the field-circuit onto the machine cannot be thrown. To indicate when the current is passing through the field due to this cause, we place a number of incandescent lamps in circuit in such a manner that the throwing of the switch will cause them to light.

In the accompanying drawing there is shown diagrammatically a station with a machine connected to either side of the system, and a spare machine adapted to be thrown on either side.

Although only one machine is shown as being provided with switches for changing the circuits, it is evident that any or all of the machines could be so provided.

A, B, and C represent, respectively, the positive, neutral, and negative bus-bars of a three-wire system.

D is a positive equalizer and E is the negative.

For the purpose of illustration one machine is shown as being permanently connected to each equalizer, but it is understood that in a central station there would be several such machines.

$M^2$ is a compound-wound generator with a resistance L for regulating the field, and is shown as feeding the positive side of the system while the machine M' is feeding the negative. Machine M is open-circuited, but there is current flowing through the field-windings from the positive bus-bar A through the left-hand side of the switch F, through the series and shunt windings, resistance L, switch H to the neutral bus-bar B. There would also be a current passing from a point $k$ through the lamps K to the switch I, to the switch H where it would unite with the current from the field-windings. The connections through the switch F would equalize any difference of potential between the machines on the opposite side of the system.

If the switch F were thrown down, so as to close the circuit on the contacts $f f'$, the current would pass through the field-windings and lamps as before, but it would be of the opposite sign, for they are connected with the negative side of the system.

Feeders O O' are connected to the positive side of the system and N N' to the negative. In order to prevent the switch I from being closed while switch H is closed, an arm J is connected to the lower part of the switch I in such a manner that the end strikes against the blade of switch H and prevents further movement thereof until H has been opened. On the other hand, if switch I is closed H cannot be thrown, for the arm J projects under the blade, preventing it from closing.

Assume, for example, that the positive side of the system is overloaded and that it is necessary to throw the spare machine M onto that side. If this machine has previously been used on the negative side of the system the residual magnetism would tend to build the machine up in the same direction as before. As this would make the electromotive force of this machine oppose the others on the same side of the system it is necessary to insure the magnetization in the proper direction, and this is done by opening the circuit of the machine at the switch G and closing switches F and H, as shown, which will allow a current from the bus-bars to flow through the fields in such a direction as to insure the magnetization of the fields being in the proper direction to deliver a positive current from the right-hand brush when the machine is started up. It is only necessary to close this circuit momentarily, after which the switch H is opened and switch I closed, thus throwing the shunt-field onto its own armature. After the machine has come up to speed in the usual way the switch G is closed, completing the circuit to the positive side of the system.

If it were desired to throw the machine M onto the negative side of the system, the same procedure would be followed, except that the switch F would be thrown down, and then the machine would build up with a negative potential at the right-hand brush and the current flowing through the series coil would be equalized by the negative equalizer E.

What we claim as new, and desire to secure by Letters Patent of the United States, is—

1. The method of changing a compound-wound generator from the positive to the negative side of a three-wire system or vice versa which consists in interrupting the main circuit, "flashing" the fields from the side of the system on which the machine is to be thrown, closing the shunt-field upon its own armature, and finally closing the main switch of the generator, thus completing the circuit.

2. In a three-wire system the combination of compound-wound generators connected to bus-bars, positive and negative equalizers, and switches for reversing the connections of the series coils when changed from the positive to the negative side of the system or vice versa.

3. In a three-wire system, the combination of compound-wound generators connected respectively to the positive and negative sides of the system, positive and negative equalizers, equalizing the flow of current on their respective sides of the system and switches for throwing the machines from one side to the other.

4. In a three-wire system, the combination of compound-wound generators supplying the sides of the system, with positive and negative equalizers equalizing the current on their respective sides, and switches for changing the connections of the machines from one side of the system to the other.

5. The combination, with a three-wire system, of a compound-wound generator provided with a switch or switches for changing the connection of the series coil from the positive to the negative equalizer or vice versa when the machine is changed from one side of the system to the other.

6. The combination, with a three-wire system, of a compound-wound generator adapted to be thrown on either side thereof, and a switch or switches for closing the fields on a local circuit between one side of the system and the neutral to give them an initial magnetization in the proper direction.

7. In combination with a three-wire system, a compound-wound generator adapted to be thrown on either side of the system, a switch for closing the fields on a circuit from the bus-bars, a switch for closing the shunt-field upon the armature of the machine, and an interlocking device between the switches whereby only one can be thrown at a time.

8. The combination, in a three-wire system, of a compound-wound generator adapted to be thrown upon either side of the system, switches for reversing the connections of the series coil and equalizer, a switch for closing the fields on a local circuit with the bus-bars, and a two-way switch for completing a lamp-circuit in one position and the shunt-field circuit in the other.

9. The combination, in a three-wire system, of a compound-wound generator provided with switches for reversing the connections when changed from one side of the system to the other, means for giving the fields an initial magnetization in the proper direction, indicating-lamps in circuit with said means, and a switch for cutting out these lamps when the fields are closed upon the machine itself.

In witness whereof we have hereunto set our hands this 9th day of September, 1895.

EDWARD M. HEWLETT.
WILLIAM B. POTTER.

Witnesses:
A. F. MACDONALD,
F. E. CASE.